US007629601B2

(12) United States Patent
Glassner et al.

(10) Patent No.: US 7,629,601 B2
(45) Date of Patent: Dec. 8, 2009

(54) LED FLASHER

(75) Inventors: Alan Glenn Glassner, Columbus, OH (US); Richard Hansler, Pepper Pike, OH (US); Edward Carome, Beachwood, OH (US); Richard Schweder, Powell, OH (US)

(73) Assignee: ADB Airfield Solutions, LLC, Columbus, OH (US)

( * ) Notice: Subject to any disclaimer, the term of this patent is extended or adjusted under 35 U.S.C. 154(b) by 50 days.

(21) Appl. No.: 11/743,362

(22) Filed: May 2, 2007

(65) Prior Publication Data

US 2008/0001061 A1 Jan. 3, 2008

Related U.S. Application Data

(60) Provisional application No. 60/746,218, filed on May 2, 2006.

(51) Int. Cl.
*G08B 5/22* (2006.01)
*G01J 1/44* (2006.01)
*H05B 37/02* (2006.01)

(52) U.S. Cl. ........................ 250/552; 340/953; 340/956; 340/815.45; 315/130; 315/224

(58) Field of Classification Search ................. 250/206, 250/214 R, 552; 315/130, 200 A, 210, 291, 315/224; 340/815.45, 953, 956, 981, 983
See application file for complete search history.

(56) References Cited

U.S. PATENT DOCUMENTS

| | | | | |
|---|---|---|---|---|
| 4,449,073 | A | 5/1984 | Mongoven et al. | |
| 4,593,345 | A * | 6/1986 | Beggs | 362/267 |
| 4,937,720 | A * | 6/1990 | Kirchberg | 363/41 |
| 6,683,419 | B2 | 1/2004 | Kriparos | |
| 7,088,263 | B1 * | 8/2006 | Krause et al. | 340/947 |
| 7,479,898 | B2 * | 1/2009 | Barnhart et al. | 340/981 |
| 2005/0030192 | A1 | 2/2005 | Weaver et al. | |
| 2005/0110649 | A1 | 5/2005 | Fredericks et al. | |
| 2006/0007012 | A1 | 1/2006 | Machi et al. | |
| 2008/0001061 | A1 * | 1/2008 | Glassner et al. | 250/206 |

OTHER PUBLICATIONS

International Search Report for Application No. PCT/US2007/010593 dated Feb. 29, 2008.
Ohno, et al., Modified Allard Method for Effective Intensity of Flashing Lights, Apr. 23, 2003, pp. 1-6.
Ohno, Yoshi, Report on the CIE Workshop: Photometry of Flashing Lights, International Commission On Illumination, Jun. 25, 1999, pp. 1-6, http://cie2.nist.gov/meetings/1999_Warsaw/Workshop_Proceeding4.htm.

* cited by examiner

*Primary Examiner*—John R Lee

(57) ABSTRACT

A system and method for producing a flash of a desired intensity and duration utilizing devices of a lower intensity, such as light emitting diodes (LED's). The on period of the LED is lengthened so that the product of the LED's intensity and the on period is approximately equal to the product of the desired intensity and duration of the flash. A parameter for determining intensity, such as operating current or voltage, can be measured and the on period can be adjusted accordingly. The device can be turned on responsive to an external trigger signal, and a timer can be utilized to turn the device on if the external trigger signal is not received within a predetermined time.

14 Claims, 10 Drawing Sheets

LED FLASHER

CROSS-REFERENCE TO RELATED APPLICATIONS

This application claims the benefit of priority of U.S. Provisional Application No. 60/746,218 filed May 2, 2006.

BACKGROUND OF THE INVENTION

The present invention relates generally to flash lamp systems such as are often used in airfield lighting systems.

In current airport approach systems, xenon flash lamps are used to produce high intensity white flashing light. These lights may be flashed in two modes, the first being in unison on either side of the runway threshold, which are known as Runway Edge Identifier Light (REIL). The second mode is in sequence pulsing towards the runway known as Medium Intensity Approach Lighting Sequenced Flasher (MALSR) or Approach Lighting Sequenced Flashers (ALSF).

Xenon flash lamps produce very brief pulses of high intensity light that are measured in the microsecond range up to a few milliseconds. Xenon flash lamp systems have some drawbacks that LED (Light Emitting Diode) lamps do not have. For example, xenon flash lamps are rated for 1,000 hours, requiring frequent maintenance. Xenon lamps require extremely high voltages (as high as 15 KV), requiring expensive power supplies along with safety issues and reliability problems associated high voltages. For dimming purposes, the light output for xenon flash lamps are adjusted by switching in and out large amounts of capacitance, requiring additional complexity in the control circuit that impacts cost and reliability.

The aforementioned problems can be avoided by using LED systems. LEDs have life expectancies of over 50,000 hours. LEDs can operate on standard low voltages. Moreover, LEDs can be dimmed by controlling the amount of time that the LEDs are on, which can usually be done without complicated circuitry. However, a problem with prior art LED systems is that they do not provide the same intensity as a xenon flash tube.

BRIEF SUMMARY OF THE INVENTION

In accordance with an example embodiment, there is disclosed herein a concept that enables utilization of LEDs to provide flashing light with sufficient intensity such as are needed for airport lighting systems. As used herein, LEDs also includes infra-red (IR) LEDs.

In accordance with an example embodiment, there is disclosed herein a lighting system for producing a flash at a predetermined effective intensity. The lighting system comprising a light emitting device, a driver circuit coupled to the light emitting device operable to operate the light emitting device at a predetermined current to produce a flash at a desired intensity, and an intensity sensor for determining the desired flash intensity coupled to the driver circuit. The driver circuit is configured to operate the light emitting device by producing a current pulse for a predetermined amount of time to produce a flash at the desired flash intensity. The intensity sensor is one of group consisting of a current sensor, a voltage sensor and a photometric sensor.

In accordance with an example embodiment, there is disclosed herein a lighting apparatus. The lighting apparatus comprising a first surface, a second surface coupled at a first angle to the first surface, a third surface coupled at a second angle to the second surface, and at least one light emitting diode array, comprising a plurality of light emitting diodes. At least one light emitting diode of the light emitting diode array is located on the first surface, at least one light emitting diode of the light emitting diode array is located on the second surface and at least one light emitting diode of the light emitting diode array is located on the third surface.

In accordance with an example embodiment, there is disclosed herein a flashing light system. The flashing light system comprises a means for sensing a magnitude of an associated alternating current for determining a desired flash intensity, a means for determining a flash interval based on the magnitude of the associated alternating current, and a means for operating a light emitting device to produce a flash of light for the flash interval.

In accordance with an example embodiment, there is disclosed herein a flash head apparatus. The flash head apparatus comprises a light emitting diode array, a light emitting diode array driver circuits coupled to the light emitting diode array, a trigger signal conversion circuit coupled to a trigger pulse generation circuit for converting a trigger voltage signal to a trigger current signal, and a step down circuit for converting a voltage received across an anode coupler and a cathode coupler to a current. The light emitting diode array circuits are coupled to the trigger signal conversion circuit and step down circuit and responsive to adjusting the duration of a light flash produced by the light emitting diode array.

In accordance with an example embodiment, there is disclosed herein a method for operating a flashing light system. The method comprises sensing a magnitude associated alternating current for determining a desired flash intensity, determining a flash interval based on the magnitude of the associated alternating current, and operating a light emitting device to produce a flash of light for the flash interval.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Figure 1:
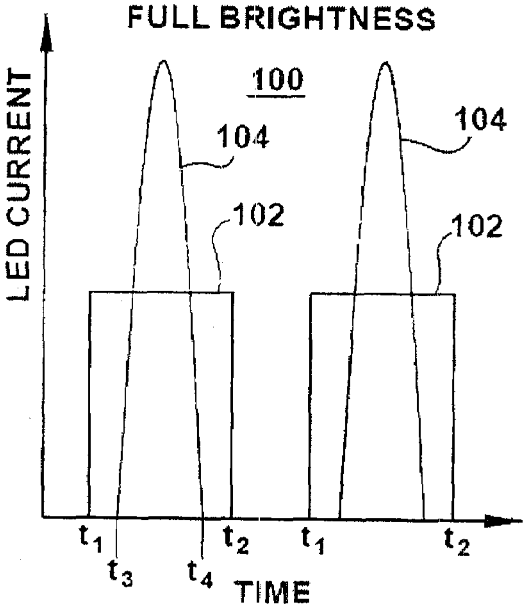
FIG. 1 is a graphical diagram of intensity over time for a flash lamp employing pulsed operation.

Throughout this description, the preferred embodiment and examples shown should be considered as exemplars, rather than limitations, of the present invention. An aspect of the present invention is to utilize Light Emitting Diodes (LEDs) for flashing light systems. In accordance with an aspect of the present invention, the LED flashing light systems can meet FAA (Federal Aviation Administration) and ICAO (International Civil Aviation Organization) photometric specifications for flashing light systems, such as Runway Edge Identifier (REIL) and Medium Intensity Approach Lighting Sequence Flasher (MALSR) or high intensity Approach Lighting Sequenced Flasher (ALSF).

An aspect of the present invention relies on two characteristics of the human visual system involved in the application of LEDs to airport flash devices, which are as follows. The first concerns the perceived flash duration. For flashes shorter than about 70-100 ms the eye cannot accurately judge the flash duration. If the total number of photons delivered to the eye is approximately the same, the flash that lasts 5 ms looks no different from the flash that lasts 70 ms. This is because the detection of the flash by the cells in the retina requires converting the light energy into chemical energy and the movement of molecules through the cell, which requires a finite time. This means the 5 ms flash produced by the xenon flash lamp and the 70 ms flash of LEDs look identical, if the total energy in the flashes is similar.

The second characteristic of the human visual system involves the perception of intensity. Extensive testing has demonstrated that the human response to a flashing light is much greater than to a steady burning light and that the shorter the flash duration, the bigger the effect. The mathematical statement of this is the Blondel-Rey equation (as shown below). It states that if the flash is 800 ms or longer, there is no effect of the duration of the flash. For flashes shorter than 800 ms the effectiveness gradually increases until the flash duration is negligible compared to 200 ms, i.e. a few milliseconds. For flashes that short or shorter, the effectiveness of the flash is five (1/0.2) times that of a steady burning light. For a flash of 100 ms the effectiveness is 1/0.3 or 3.3 times that of a steady burning light. Comparing the 5 times effectiveness of a xenon flash with the 3.3 times effectiveness of the LED flash, the xenon flash is 5/3.3/or 1.5 times as effective as the 100 ms LED flash. Because of the facts discussed in the previous paragraph the Blondel-Rey equation is not always applicable to flashes shorter than about 70-100 ms. Nevertheless, since the FAA has chosen to accept the Blondel-Rey equation as an adequate representation of reality, the description in this application assumes the Biondel-Rey equation is acceptable for use as described herein.

Flashing lights have an effective intensity that is based on the amount of light energy over time. According to FAA-E-1100, the effective intensity for flashing lights is characterized by the following Blondel-Rey formula:

$$I_e = \frac{\int_{t1}^{t2} I dt}{0.2 + t_2 - t_1}$$

where:

$I_e$=Effective intensity (Candela)

I=Instantaneous intensity (Candela)

$t_1$, $t_2$=Times in seconds of the beginning and end of the flash.

As can be seen from the above equation, effective intensity is a function of light intensity and time. In accordance with an example embodiment, there is described herein a technique to maintain effective intensity while utilizing reduced light output. The effective intensity is achieved by varying the duration between $t_1$ and $t_2$ to increase the time of the flash. In an example embodiment, the product of ($t_2$-$t_1$) and I for the lower intensity device is approximately equal to the product of ($t_2$-$t_1$) and I for the higher intensity device. As explained above, because of the increased effectiveness of the shorter duration flash the products of intensity and time are somewhat different for the two cases. As used herein, approximately is within 20% of a desired value, preferably within 10%.

For example, referring to FIG. 1, there is a graphical representation 100 for two different flashing light systems. The first flashing light system produces a first light pulse 104 that is of higher intensity than a second light pulse 102 produced by a second device. In accordance with an example embodiment, the duration of the second light pulse is increased so that the area under pulse 102 is approximately equal to the area under pulse 104. Thus, if the intensity of the flash for the first light device is characterized by the above function, then the intensity of the first light device can be characterized by:

$$I_e = \frac{\int_{t4}^{t3} I_2 dt}{0.2 + t_4 - t_3}$$

where a peak value for $I_2$ is greater than a peak value for I, however a value for $t_2$-$t_1$ is selected to be greater than the value of $t_4$-$t_3$ such that the total intensity $I_e$ of the flash produced by both lights are approximately equal.

Figure 2:
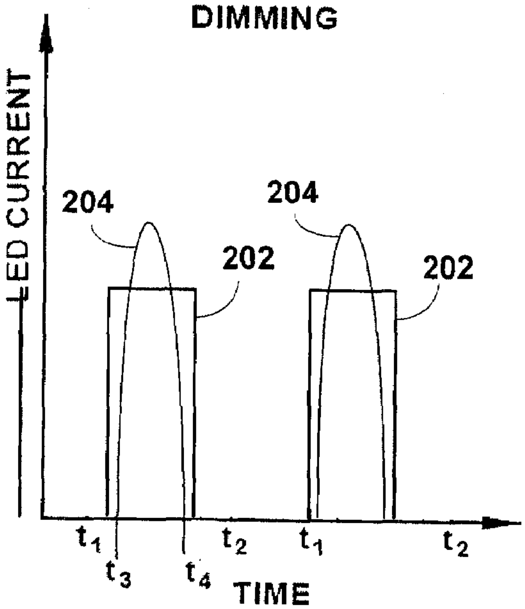
FIG. 2 is a graphical diagram of intensity over time for a flash lamp employing pulsed operation for a lower intensity than the intensity illustrated in FIG. 1.

Referring to FIG. 2, there is illustrated a lower effective intensity flash for the same lights referenced in FIG. 1. As can be observed, the peak intensity of flash 204 produced by the second light is the less than the peak intensity of flash 104 Accordingly, the duration of the pulse for producing flash 202 is less than the duration of the pulse for producing flash 102 to provide the required dimming.

The aforementioned ability to produce flashes of a desired intensity with lower intensity light devices is particularly useful for implementing Light Emitting Diode (LED) systems. As will be described herein, LED flash systems are particularly desirable in airfield implementations because LED lights last much longer than xenon lights and do not require high voltage. Although the lighting systems described herein are described as particularly adapted for airfield implementations, those skilled in the art can readily appreciate that aspects of the present invention as described herein are suitably adaptable to any lighting application that produces a flash of a desired intensity.

Figure 3:
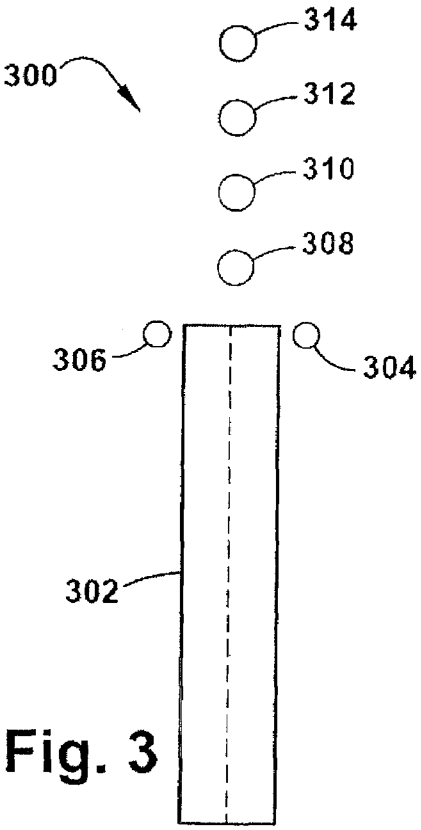
FIG. 3 is a top view of a standard airfield runway with Runway Edge Identifier Lights and Medium Intensity Approach Lighting Sequenced Flashers.

FIG. 3 is a top view of a standard airfield 300 comprising a runway 302 with Runway Edge Identifier Lights (REILs) 304, 306 and Medium Intensity Approach Lighting Sequenced Flashers (MALSRs) 308, 310, 312, 314. Runway Edge Identifier Lights 304, 306 (REILs) are installed at many airfields to provide rapid and positive identification of the approach end of a particular runway. Medium Intensity Approach Lighting Sequence Flashers (MALSRs) 308, 310, 312, 314 are a system of flashing lights that flash in sequence (e.g. 314, 312, 310, 308) to aid in alignment with the center of a runway. The lights are flashed in sequence (314, 312, 310, 308 to indicate the direction of approach to the runway. The number of MALSRs flash lamps illustrated in FIG. 3, four, is merely for ease of illustration as a typical airfield has more than four MALSRs (e.g. 5, 15, or any reasonable number). An ALSF system can have up to 30 flashers. As will be described herein, aspects of the present invention are suitably adapted to use lower power flashers, such as LED flashers for use as REILs, MALSRs and ALSFs). The flashers can be uni-directional or omni-directional (ODAL).

Figure 4:
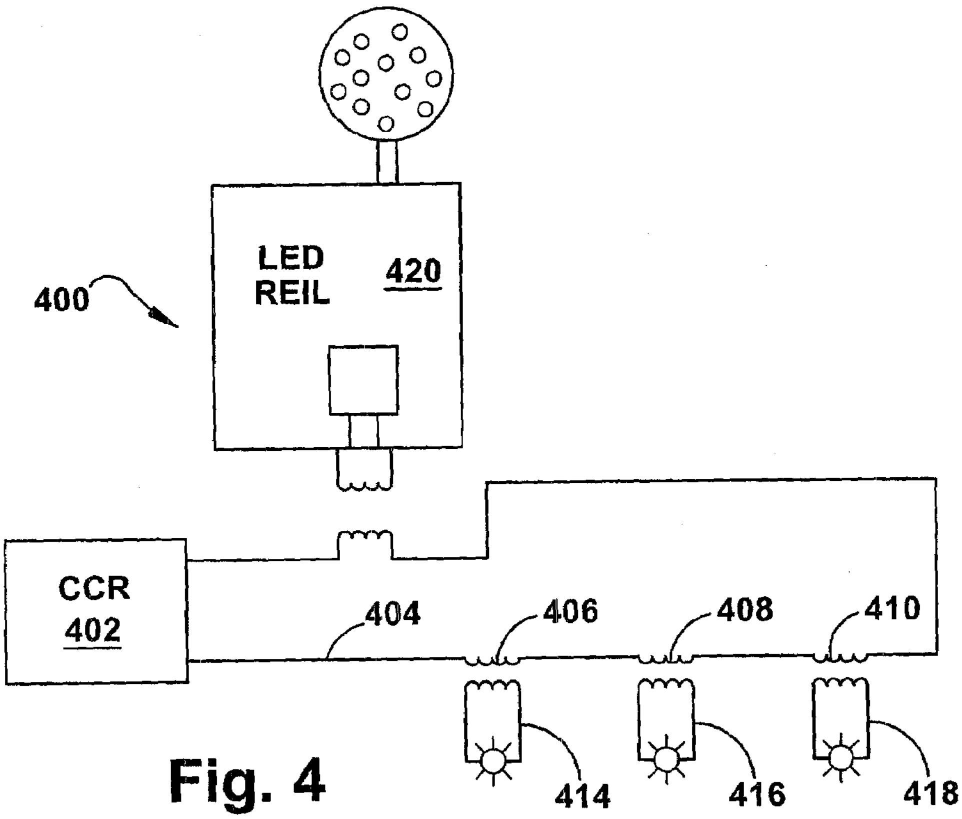
FIG. 4 is a schematic diagram of an airfield with lighting.
Figure 5:
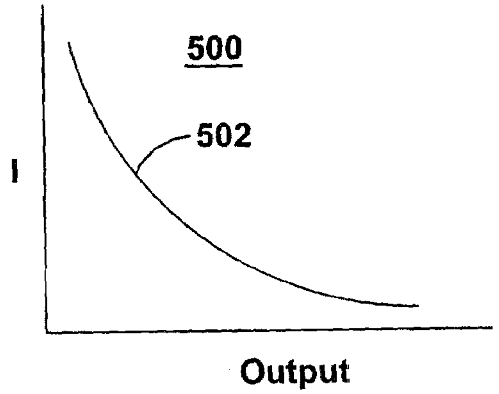
FIG. 5 is an example graph illustrating current versus light output for a LED.

Referring to FIG. 4, there is illustrated a schematic diagram for a system 400 of REILs, MALSRs or AlSFs controlled by a current source (CCR) 402. Current from CCR 402 is provided through circuit 404 to current transformers 406, 408, 410 for lighting systems 414, 416, 418 respectively. Current is also provided to current transformer 421 to an LED REIL 420. As will be explained herein, the level of current provided by CCR 402 is indicative of the intensity of the required flash (e.g. the higher the current, the higher the intensity of the flash). For a typical airfield system, a 6.6 amp current is provided for full intensity, a 5.5 amp current for 30% intensity and a 4.8 amp current for 10%. There are also 5 step series circuit systems that can have a current as low as 2.8 A. It should be noted that the relationship of light intensity as a function of current may not be linear, as illustrated by a plot 500 of intensity versus output (curve 502) in FIG. 5. As is described herein, an aspect of the present invention is to vary the effective intensity of a flash of light based on detected current by varying the time the light is turned on. Alternatively, instead of current sensing, dedicated hardwired remote intensity commands can also be used.

Figure 6:
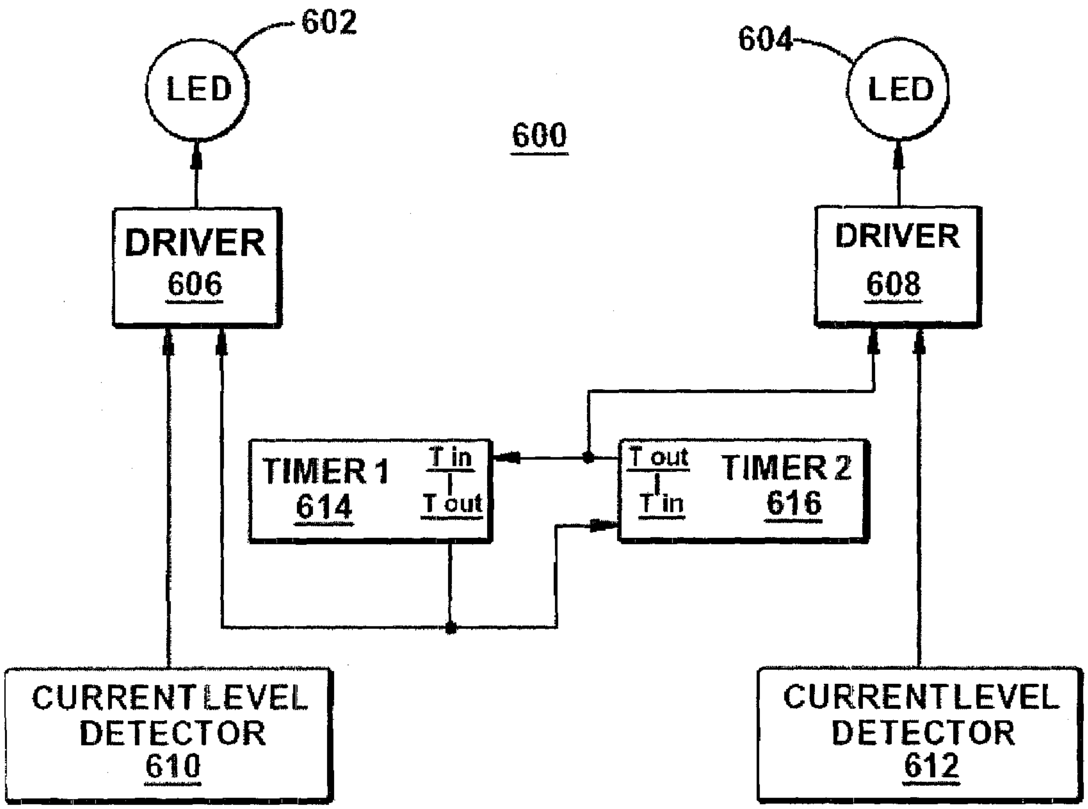
FIG. 6 is a schematic diagram of a synchronized flashing system.

Referring to FIG. 6, there is illustrated a schematic diagram of a synchronized flash system 600. In an example embodiment, sequenced flash system is utilized to implement a REIL system utilizing LEDs to produce a flash. REIL 600 comprises a pair of synchronized flashing LEDs 602, 604. According to FAA requirements (see Advisory Circular AC 150/5345-51), omni-directional lights should have a flash rate of 60 flashes per minute (within 10 percent) and unidirectional lights should have a flash rate of 120 flashes per minute. Both optical assemblies must flash simultaneously with no more than 20 milliseconds between them (e.g. LED 602 and LED 604 flash within 20 milliseconds of each other).

LED 602 is turned on and off (e.g. flashed) by LED driver 606. LED driver 606 receives input from current level detector 610. Current level detector 610 sends data to LED driver 606 representative of a current level of an associated circuit. LED driver 606 bases the duration of the pulse sent to LED 602 on the current detected by current level detector 610. Similarly, LED driver 608 receives input from current level detector 612. Current level detector 612 sends data to LED driver 606 representative of a current level of an associated circuit. LED driver 608 bases the duration of the pulse send to LED 604 on the current detected by current level detector 612. Alternatively, current level detector 610 can provide data to both LED driver 606 and LED driver 608.

For example, when implementing a REIL such as REIL 420 in FIG. 4, the current provided by CCR 402 determines the desired intensity. An aspect of the present invention is that the flash duration is adjusted to provide the desired level of effective intensity. For example, for a circuit with a 3 step Regulator (6.6 amp), a high intensity flash is indicated by a 6.6 amp current, medium intensity flash by a 5.5 amp current and a low intensity current by a 4.8 amp current. As illustrated in Table 1, for full intensity flash, indicated by a 6.6 amp current, a flash duration of 100 ms is used on LED 602 and LED 604. For a medium intensity flash, indicated by a current of 5.5 amps, a 30 ms flash duration of LEDs 602, 604, and for a low intensity flash, indicated by a current 4.8 amps, a 10 ms flash duration is used.

TABLE 1

| Runway Lighting Circuits | CCR Current | Discharge Lighting Equipment Intensity Level | Flash Duration |
|---|---|---|---|
| Medium | 3 Step Regulator (6.6 Amps (A)) | | |
| Intensity | 6.6 (A) | High Intensity | 100 ms |
| Runway | 5.5 A | Medium Intensity | 30 ms |
| Lighting | 4.8 A | Low Intensity | 10 ms |

For example, if current level detector 610 detects a 6.6 amp current, a signal is provided by current level detector 610 to LED driver 606. LED driver 606 is responsive to the signal from current level detector 610 to produce a 100 ms pulse to LED 602 for producing a 100 ms flash. Similarly, if current level detector 612 detects a 6.6 amp current, a signal is provided by current level detector 612 to LED driver 608. LED driver 608 is responsive to the signal from current level detector 612 to produce a 100 ms pulse to LED 604 for producing a 100 ms flash.

Timer1 614 provides a trigger signal to LED driver 606 and LED driver 616 so both units flash at the same time and for the same duration. after a predetermined time period expires. Timer1 614 also sends a signal to Timer2 616 when it sends a trigger signal to LED driver 606. Timer1 614 receives an input from timer2 616. Timer2 sends a pulse to timer1 614 when it is triggering LED driver 608. When timer1 614 receives a signal from timer2, it sends a trigger signal to LED driver 606 if the predetermined time period has not expired.

Similarly, timer2 616 sends a trigger pulse to LED driver 608 when a predetermined time period expires. However, if time2 616 receives a signal from timer1 614 before the time period expires, timer2 616 sends a trigger signal to LED driver 608.

By coupling timers 614, 616 together, this increases system redundancy by allowing each timer to be a backup for the other timer. LEDs 602, 604. Whichever timer 614, 616 expires first sends a signal to the other timer causing that timer to immediately send a trigger pulse to its associated LED driver.

For cases in which a larger range in effective intensity is required, or for convenience, both the magnitude of the current through the LEDs and the duration of the current pulse may be changed. The various intensities that may be required can also be accomplished by changing the circuits so that different numbers of LEDs are flashed.

Figure 7:
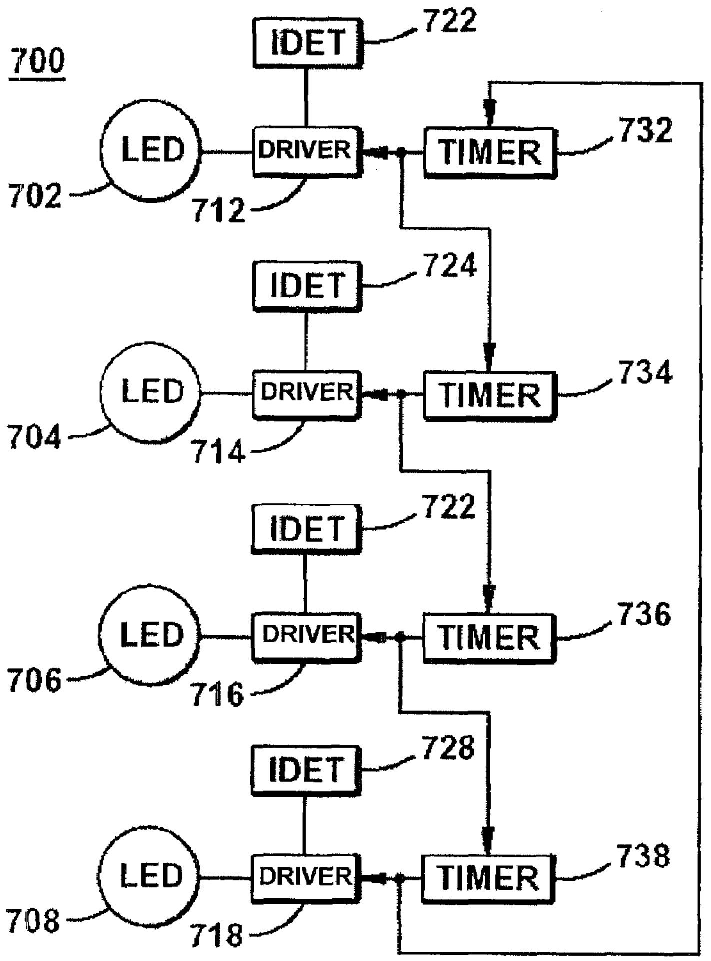
FIG. 7 is a schematic diagram of a sequenced flash system.

FIG. 7 is a schematic diagram of a sequenced flash system 700. In an example embodiment, sequenced flash system 700 is used to implement a Medium Intensity Approach Lighting Sequenced Flasher (MALSR). Although system 700 in FIG. 7 illustrates a four light system, those skilled in the art can readily appreciate that system 700 is capable of providing a flash sequence for any reasonable number of lights.

The first light of system 700 comprises LED 702, LED driver 712, current detector 722 and timer 732. LED driver 712 sends a pulse to produce a flash from LED 702. LED driver bases the duration of the pulse (and thus the intensity of the flash produced by LED 702) on the current detected by current detector 722 and determines when to trigger the pulse based on a signal received from timer 732.

The second light of system 700 comprises LED 704, LED driver 714, current detector 724 and timer 734. LED driver 714 sends a pulse to produce a flash from LED 704. LED driver bases the duration of the pulse (and thus the intensity of the flash produced by LED 704) on the current detected by current detector 724 and determines when to trigger the pulse based on a signal received from timer 734.

The third light of system 700 comprises LED 706, LED driver 716, current detector 726 and timer 736. LED driver 716 sends a pulse to produce a flash from LED 706. LED driver bases the duration of the pulse (and thus the intensity of the flash produced by LED 706) on the current detected by current detector 726 and determines when to trigger the pulse based on a signal received from timer 736.

The first light of system 700 comprises LED 708, LED driver 718, current detector 728 and timer 738. LED driver 718 sends a pulse to produce a flash from LED 708. LED driver bases the duration of the pulse (and thus the intensity of the flash produced by LED 708) on the current detected by current detector 728 and determines when to trigger the pulse based on a signal received from timer 738.

In operation, timers 732, 734, 736, 738 flash their corresponding LEDs, 702, 704, 706, 708 respectively when they expire. However, each timer 732, 734, 736, 738 receives a trigger signal from the timer of the preceding light. By setting the timers to incremental values, the sequence of the flashes can be controlled. For example if a flash sequence of 702, 704, 706 708 is desired, by setting the timing interval for timer 732 to the shortest interval, and 734 slightly longer than 732's interval, 736 slightly longer than 734's interval and 738 slightly longer than 736's interval, 702 will always flash first followed by 704, 706 and 708. For example timer 732 can be set to trigger after 500 ms, timer 734 can be set to trigger after 533 ms, timer 736 can be set to trigger after 566 ms and timer 738 can be set to 599 ms. As will be explained herein, if a timer does not receive a trigger pulse from a preceding stage, it will trigger a pulse when the predetermined time interval expires, still producing what appears to be a sequenced flash.

When 702 flashes, a signal is sent to timer 734, which is responsive to make LED 704 flash. As timer 734 sends a trigger signal to LED driver 714, it also sends a signal to timer 736, which causes LED 706 to flash next. Timer 736 sends a signal to timer 738 when it sends a trigger signal to LED driver 716. When timer 738 receives the signal from timer 736, it sends a trigger signal to LED driver to flash LED 708 and also sends a signal to timer 732. When timer 732 receives the signal from timer 738 it knows the sequence has completed and restarts. Timers 732, 734, 736, 738 are configured to restart after sending a trigger pulse. Thus, if a link breaks, (e.g. a light goes out of service), the flash sequence can still be maintained. For example, if timer 734 associated with second light, LED 704, were unavailable, timer 732 would still pulse LED 702 when it expires. Timer 736 would not receive a signal from timer 734, thus timer 736 will expire after its predetermined time interval expires. When timer 736's predetermined interval expires, it sends a signal to flash LED 706 and sends a trigger signal to timer 738, causing LED 708 to flash after LED 706. Timer 738 sends a signal to timer 732 and the sequence continues.

A benefit of the configuration of system 700 is that a separate control mechanism is not needed to trigger the flash sequence. Prior art systems used a central controller, which required a connection from the central controller to each light and the central controller sent the trigger signal to each light. Another benefit of the present invention is that because there is no central controller, system 700 is more robust and would not be affected by a loss of a central controller.

Figure 8:
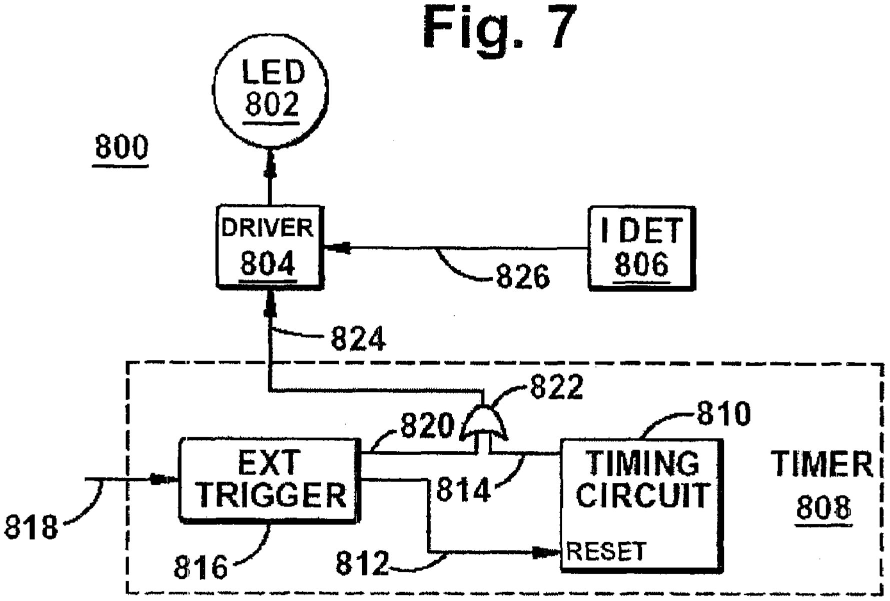
FIG. 8 is a schematic diagram of an LED lighting system suitable for use in a synchronized flashing system or a sequenced flashing system.

FIG. 8 is a schematic diagram of an LED lighting system suitable 800 for use in a synchronized flash system, such as a Runway Edge Identifier Light (REIL) and/or a sequenced flash system, such as a Medium Intensity Approach Lighting Sequenced Flasher (MALSR). For example system 800 can be used in the synchronized flash system of FIG. 6 and/or the sequenced flash system 700 of FIG. 7.

LED 802 is turned on and off (or flashed) by driver (e.g. a pulse width modulator) 804. The intensity of the flash produced by LED 802 is a function of the duration of the time LED 802 is turned by driver 804. Driver 804 receives a signal 826 from current detector (I Det) 806.

In an example embodiment, signal 826 indicates the magnitude of the current measured by current detector 806. Driver 804 is responsive to signal 826 to determine the duration of the pulse based on signal 826. Signal 824 is used by pulse width modulator 804 to determine when to initiate the pulse (e.g., when to turn LED 802 on).

In an example embodiment, current detector 806 comprises a zero crossing detection circuit that detects when the current has made a zero crossing. This can enable current detector 806 to synchronize signal 826.

Signal 824 is triggered by Timer 808. Timer 808 comprises a timing circuit 810 and a circuit for receiving an external trigger signal 816. Timing circuit 810 sends a pulse through OR gage 822 upon the expiration of a predetermined time period. However, if an external trigger signal 818 is received by external trigger circuit 816, a trigger signal is sent through OR gate 822 and a signal 812 is sent to timing circuit 810 which resets the timer. Thus, in operation, whenever a trigger signal 818 is received, it is passed through OR gate 822 to trigger pulse width modulator 804. However, if trigger signal 818 is not received before timing circuit 810 expires, the timing circuit 810 triggers pulse width modulator 804.

In an example embodiment, the pulse width of the external trigger circuit can be employed to determine the flash intensity for LED 802. External trigger circuit 816 determines the pulse width of trigger signal 818. External trigger circuit 816 can vary the pulse width of signal 820 in order to signal the desired flash intensity to driver 804. For example a pulse width of 5 milliseconds can be employed to indicate a low intensity signal, a pulse width of 25 milliseconds can indicate a medium intensity signal and a pulse width of 70 milliseconds indicates a high intensity signal.

In an example embodiment, when system 800 is employed in a synchronized flash circuit, it is desirable for LED 802 to flash as soon as an external trigger 818 signal is received. In another example embodiment, when system 800 is employed in a sequenced flash circuit, external trigger circuit 816 can further comprise a delay circuit so that the flash from LED 802 doesn't appear to occur at the same time as external trigger signal 818.

Figure 9:
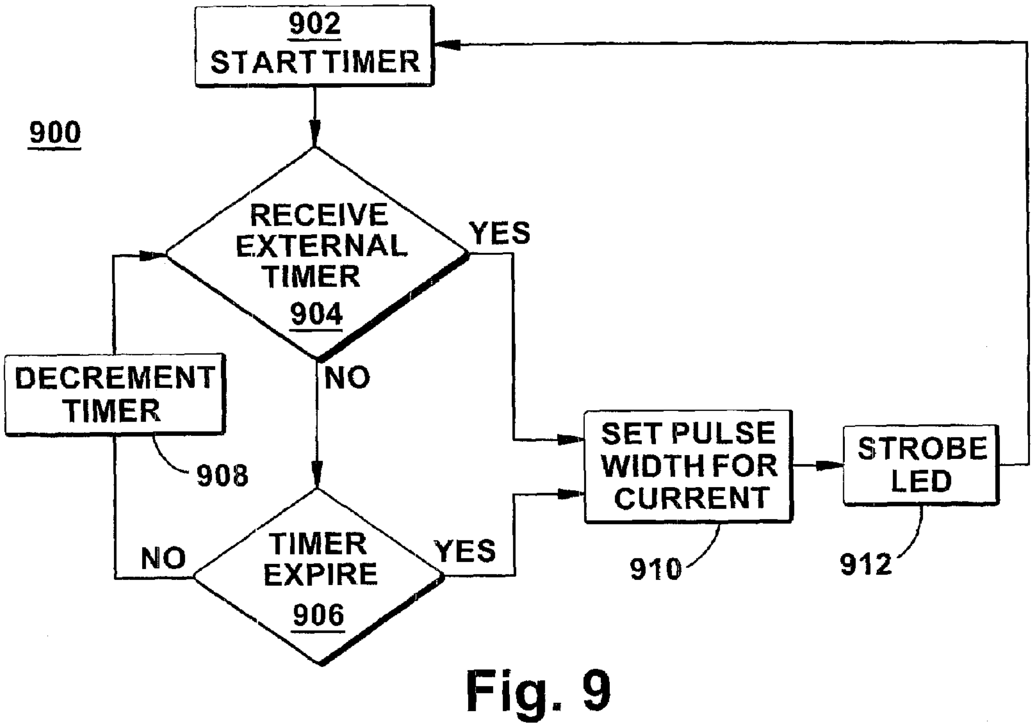
FIG. 9 is a block diagram of a methodology for operating a flasher system.

In view of the foregoing structural and functional features described herein, a methodology in accordance with various aspects of the present invention will be better appreciated with reference to FIG. 9. While, for purposes of simplicity of explanation, the methodology of FIG. 9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 9 is a block diagram of a methodology 900 for operating a flasher system. Methodology 900 is suitable for a flasher system used in a synchronized flashing system such as for a Runway Edge Identifier Light and/or a sequenced flashing system such as a Medium Intensity Approach Lighting Sequenced Flasher.

At 902 a timer is started. The timer is initiated to a predetermined interval. For a synchronized system (such as a REIL system), the timer for each light is set to approximately the same value. For a sequenced system (such as a MALSR system) the timer for each light is set incrementally, for example by either 16 or 33 ms.

At 904, a determination is made whether an external trigger signal was received. If an external trigger signal was not received (NO), at 906 a determination is made whether the timer expired. If the timer has not expired (NO) then the timer is decrements at 908 and processing returns to 904. It should be noted that in a example embodiment, step 908 is continuously being performed while waiting for an external trigger at 904.

If at 904 an external trigger signal was received (YES), or at 906 a determination is made that the timer expires (YES) then at 910 a pulse width is set. For a current operated system the pulse width is set corresponding to the measured current level. For a voltage operated system, the pulse width is set corresponding to a measured voltage level. At 912 the LED is flashed (strobed). After the LED is flashed at 912, the timer is again started at 902.

Figure 10:
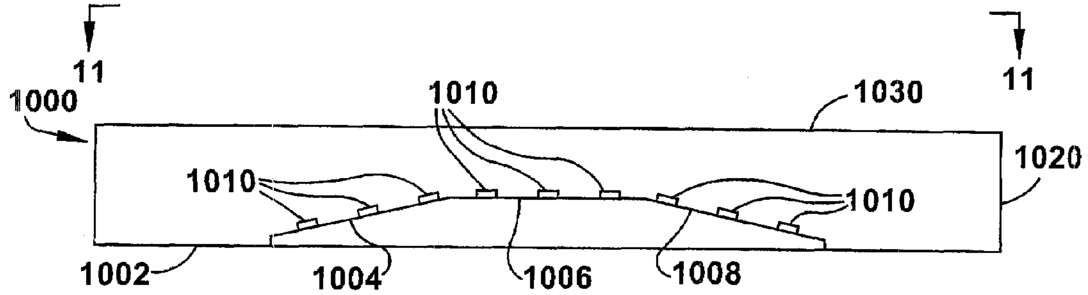
FIG. 10 is a side view of a Multi-faceted light suitable for use as a Runway Edge Identifier Light and/or a Medium Intensity Approach Lighting Sequenced Flasher.
Figure 11:
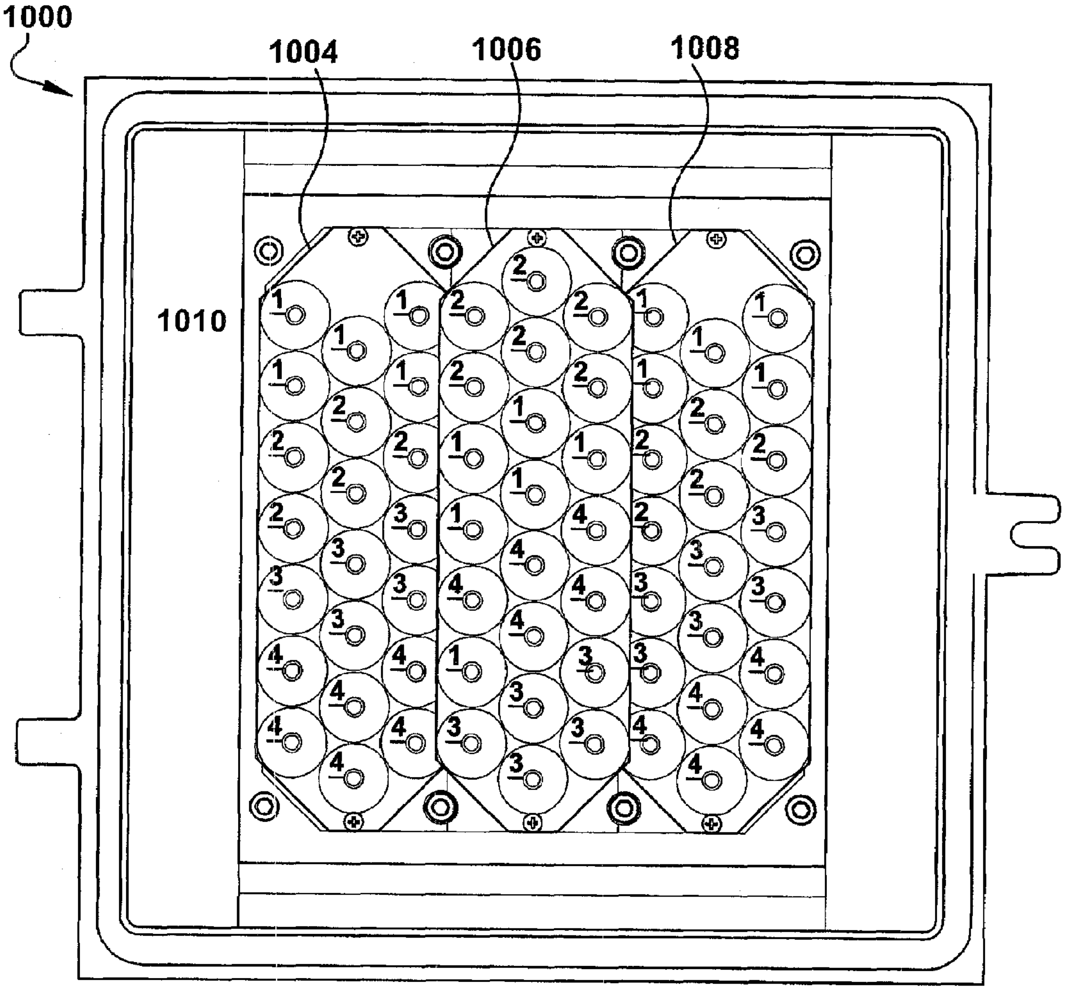
FIG. 11 is a top view of the multi-faceted light illustrated in FIG. 10.

Referring now to FIGS. 10-11, there is illustrated a top view and a side respectively of a multi-faceted light 1000. Multi-faceted light 1000 can be configured to function like system 800 (FIG. 8) and is suitable for use in a synchronized flashing system, such as a Runway Edge Identifier Light and/or is suitable for use in a sequenced flashing system such as a Medium Intensity Approach Lighting Sequenced Flasher. As shown, light 1000 has a base upon which there are three surfaces 1004, 1006, 1008. Although light 1000 as shown has three surfaces, those skilled in the art can readily appreciate that light 1000 can have as few as two surfaces and as many surfaces as can be reasonably realized. Furthermore, the faces can be extended all the way around for an omni-directional (ODAL) application. LEDs 1010 are mounted on surfaces 1004, 1006, 1008 and are directed away from their respective surface (e.g. LEDs mounted on surface 1004 are directed in a direction normal from surface 1004). A lens 1030 is supported by sides 1020 and located at the top of light 1000 for passing the light from LEDs 1030.

Multi-faceted light 1000 may further comprise individual lenses/reflectors that collimate the light from the individual LEDs 1010 are not shown in FIG. 10. These may be useful to realize the FAA required intensity distribution.

Figure 17:
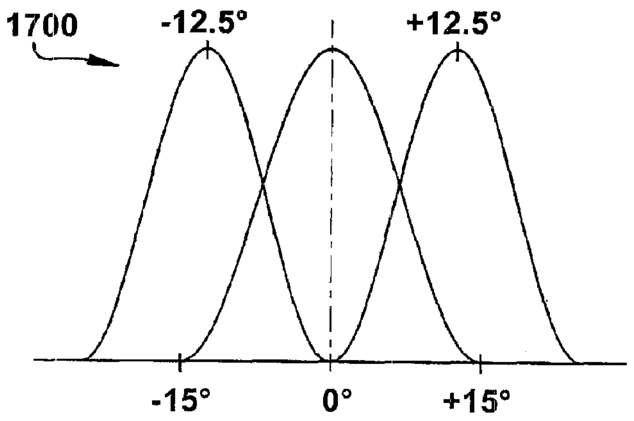
FIG. 17 is a graphical diagram illustrating light intensity as a function of angle for the systems illustrated in FIGS. 10, 11 and 16.

Surface 1004 has an angle 1032 with surface 1006, and surface 1008 has an angle 1034 with surface 1006. Angles 1032 and 1034 are selected to enable a desired amount of light to be directed perpendicular from surface 1006 as well as enabling a desired angular luminous intensity (for example as required by FAA specifications). In an example embodiment, angles 1032 and 1034 are 12.5 degrees, however, alternate embodiments contemplate a range of approximately 5 degrees to 20 degrees. An example of angular luminous intensity 1700 as a function of lights emitted from surfaces 2004, 2006, 2008 is illustrated in FIG. 17.

Control logic 1012 is used to control the operation of LEDs 1030. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Logic 1012 can be configured to function according to methodology 900 as described in FIG. 9, or can be configured to implement the various circuits described in FIG. 8.

Figure 16:
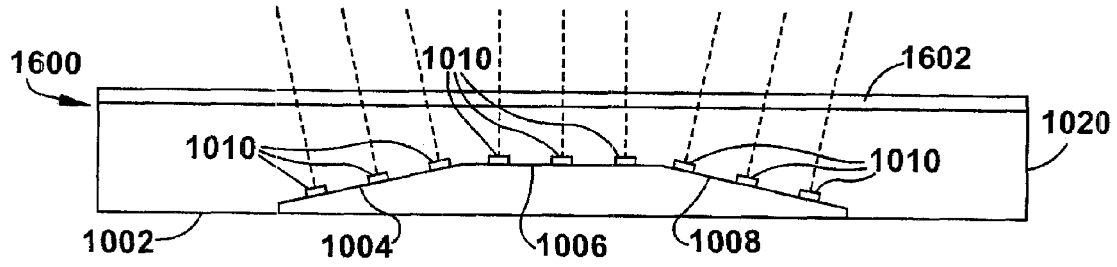
FIG. 16 is a side view of a Multi-faceted light suitable for use as a Runway Edge Identifier Light and/or a Medium Intensity Approach Lighting Sequenced Flasher that employs a collimating lens for directing light from the LEDs.

Referring to FIG. 16, with continued reference to FIG. 11, there is illustrated a side view of a multi-faceted light 1600. Multi-faceted light 1600 employs a collimating lens 1602 for directing the light from LEDs 1010. Collimating lens 1602 distributes light perpendicular to surface 1004 and also directs light to produce a desired luminous angular intensity.

Figure 18:
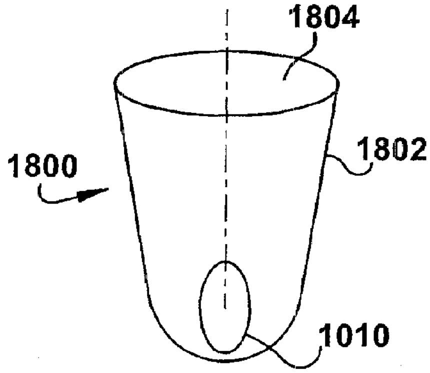
FIG. 18 is an isometric diagram of an LED fitted with a reflector and a lens to direct light suitable for the systems illustrated in FIGS. 10, 11 and 16.

FIG. 18 is an isometric diagram of a system 100 comprising an LED 1010 fitted with a reflector 1802 and a lens 1804 to direct light that is suitable for the systems illustrated in FIGS. 10, 11 and 16. Reflector 1802 is designed to reflect light in a desired direction. Lens 1804 can be a collimating lens for directing light in a desired direction. In alternate embodiments, reflector 1802 can be used by itself with LED 1010, or lens 1804 can be used by itself with LED 1010

Figure 12:
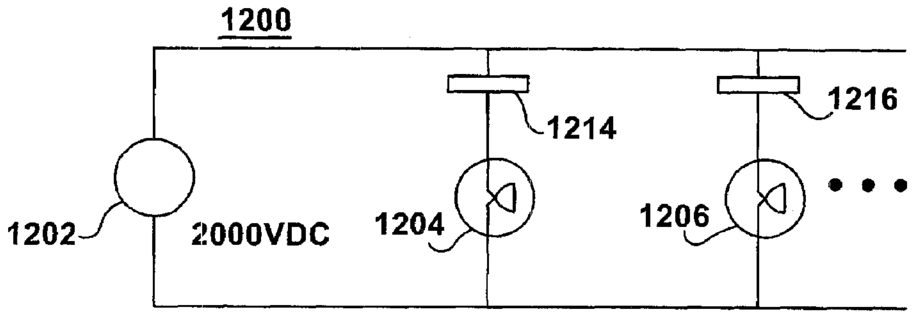
FIG. 12 is a schematic diagram of a parallel voltage operated flashing system.

FIG. 12 is a schematic diagram of a parallel voltage operated flashing system 1200, such as a MALSR. A voltage source 1202 provides power to lights 1204, 1206. Triggers 1214, 1216 control lights 1204, 1206 respectively, causing them to flash (turn on and off).

Figure 13:
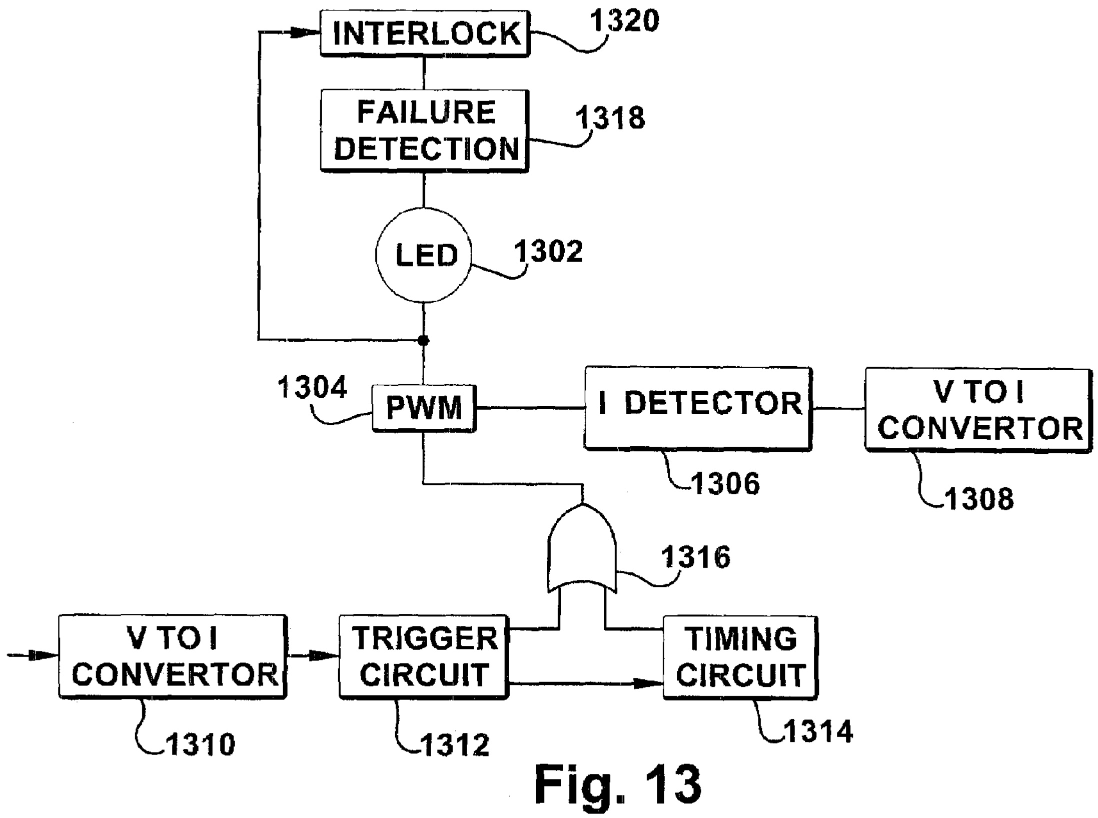
FIG. 13 is a schematic diagram of an LED light system suitably adapted for operating with a voltage operated flashing system.

FIG. 13 is a schematic diagram of an LED light system 1300 suitably adapted for operating with a voltage operated flashing system. System 1300 comprises an LED 1302. LED 1302 is controlled by LED driver 1304, which flashes (turns on/off) LED 1302 for an amount of time corresponding to a desired intensity (i.e. the higher the intensity, the longer LED 1302 is turned on). A voltage to current converter 1308 converts the received voltage to a current that is measured by current detector 1306. Current detector 1306 sends a signal to LED driver 1304 indicative of the magnitude of the current detected. In a preferred embodiment, the trigger pulse sent to system 1300 is a voltage pulse. Voltage to current converter 1310 converts the voltage pulse to a current pulse that is forwarded to trigger circuit 1312. Trigger circuit 1312 sends a signal through OR gate 1316 signaling LED driver 1304 to initiate a flash. Timing circuit 1314 is also coupled to OR gate 1316. Timing circuit 1314 is set to send a pulse upon the expiration of a predetermined time period via OR gate 1316 to LED driver 1304 to initiate a flash. However, if a trigger pulse is received before the predetermined time period expires, a signal from trigger circuit 1312 to timing circuit 1314 causes timing circuit 1314 to reset. Thus, timing circuit 1314 will cause LED 1302 to flash if a trigger signal is not received within a predetermined time.

Failure detection circuit 1318 is coupled to LED 1302 and LED driver 1304. Failure detection circuit determines if a current is flowing through LED 1302 responsive to a signal from LED driver 1304. In an example embodiment, if failure detection circuit 1318 does not detect current from LED 1302 when a pulse is sent by LED driver 1304, failure detection circuit has circuitry that would simulate the current change that normally occurs when a xenon lamp fails. Thus, system 1300 is adaptable for use with xenon MALSR systems that can detect when the xenon light fails. System 1300 also includes an interlock 1320. Interlock 1320 can be coupled to two or more portions of a housing (such as formed by base 1002, side 1020 or lens 1030) so that when one or more of base 1002, side 1020 or lens 1030 has been removed (e.g. the light has been opened) the interlock will prevent LED 1302 from operating.

Figure 14:
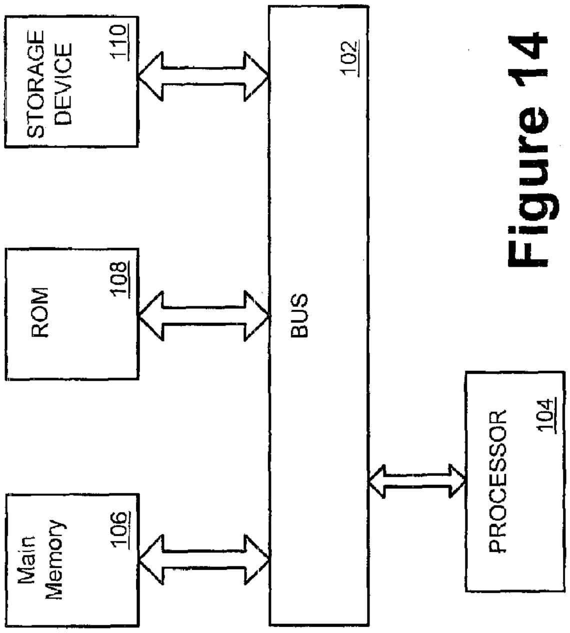
FIG. 14 is a block diagram of a computer system for implementing an aspect of the present invention.

FIG. 14 is a block diagram that illustrates a computer system 1400 upon which an embodiment of the invention may be implemented. For example, computer system 1400 can be used to implement one or more of circuits 1304, 1306, 1308, 1310, 1312, 1314, 1318, 1320 (FIG. 13); logic 1012 (FIG. 10) to implement methodology 900 (FIG. 9) and/or to implement any of the circuits described in system 600 (FIG. 6), system 700 (FIG. 7) or system 800 (FIG. 8).

Computer system 1400 includes a bus 1402 or other communication mechanism for communicating information and a processor 1404 coupled with bus 1402 for processing information. Computer system 1400 also includes a main memory 1406, such as random access memory (RAM) or other dynamic storage device coupled to bus 1402 for storing information and instructions to be executed by processor 1404. Main memory 1406 also may be used for storing a temporary variable or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

The invention is related to the use of computer system 1400 for implementing a LED flasher. According to one embodiment of the invention, implementing a LED flasher is provided by computer system 1400 in response to processor 1404 executing one or more sequences of one or more instructions contained in main memory 1406. Such instructions may be read into main memory 1406 from another computer-readable medium, such as storage device 1410. Execution of the sequence of instructions contained in main memory 1406 causes processor 1404 to perform the process steps described herein. One or more processors in a multi-processing arrangement may also be employed to execute the sequences of instructions contained in main memory 1406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1404 for execution. Such a medium may take many forms, including but not limited to non-volatile media, volatile media, and transmission media. Non-volatile media include for example optical or magnetic disks, such as storage device 1410. Volatile media include dynamic memory such as main memory 1406. Transmission media include coaxial cables, copper wire and fiber optics, including the wires that comprise bus 1402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASH-PROM, any other memory chip or cartridge, a carrier wave as described hereinafter, or any other medium from which a computer can read.

Various forms of computer-readable media may be involved in carrying one or more sequences of one or more instructions to processor 1404 for execution. For example, the instructions may initially be borne on a magnetic disk of a remote computer. The remote computer can load the instructions into its dynamic memory and send the instructions over a telephone line using a modem. A modem local to computer system 1400 can receive the data on the telephone line and use an infrared transmitter to convert the data to an infrared signal. An infrared detector coupled to bus 1402 can receive the data carried in the infrared signal and place the data on bus 1402. Bus 1402 carries the data to main memory 1406 from which processor 1404 retrieves and executes the instructions. The instructions received by main memory 1406 may optionally be stored on storage device 1410 either before or after execution by processor 1404.

Figure 15:
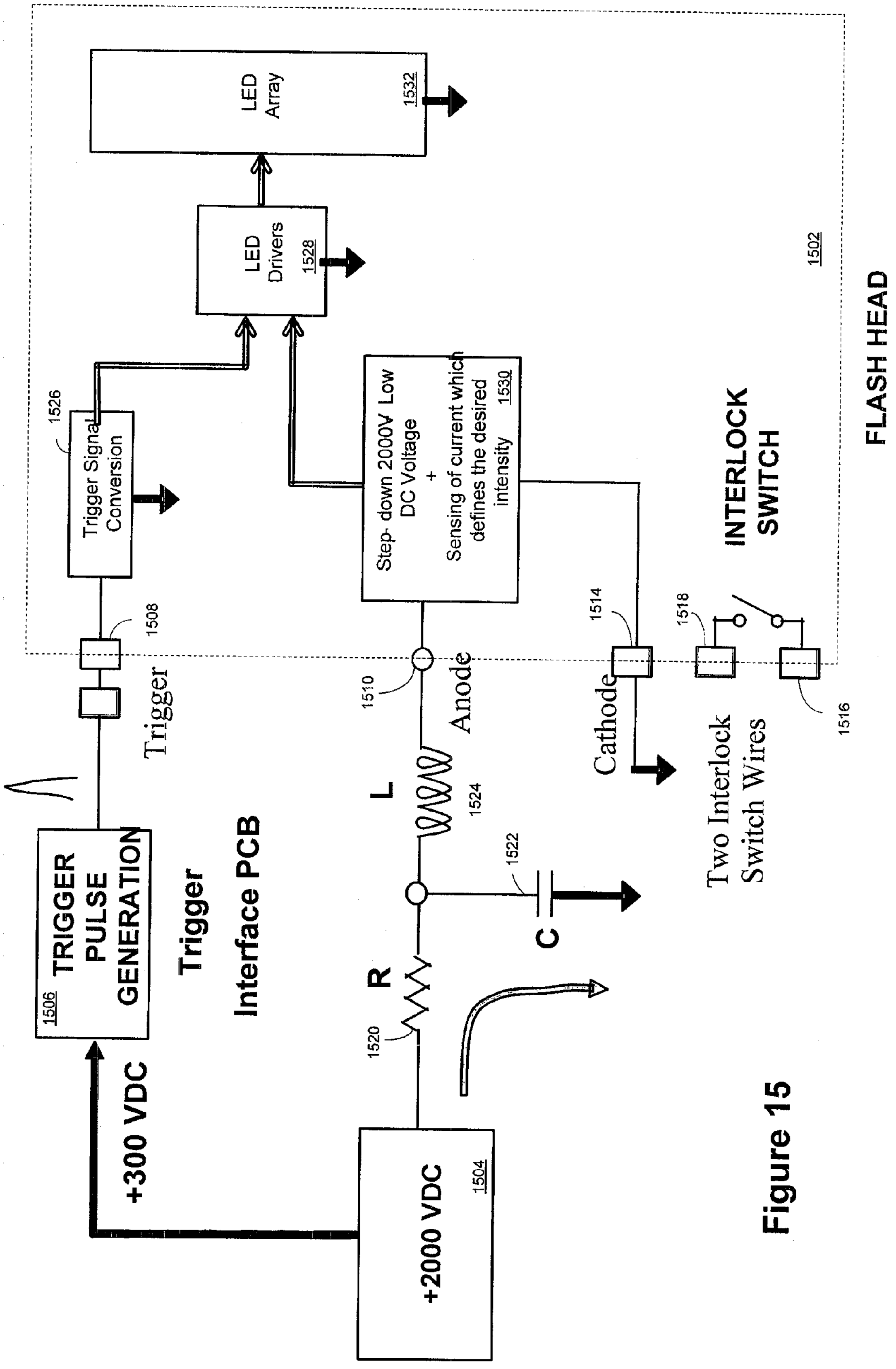
FIG. 15 is a schematic diagram of an LED retrofit application.

FIG. 15 is a schematic diagram of a system 1500 having an LED retrofit application wherein a flash head (such as a Xenon flash head) is substituted with an LED (or LED array). A typical flash head consists of a sealed PAR 56 Xenon flash tube with a lamp life of 1000 hours at high intensity, a trigger transformer, silicone gasket and a safety interlock switch. An aspect of the present invention contemplates that a flash head 1502 comprising a Trigger Signal conversion circuit 1526, a step down circuit 1530 for stepping down the 2000 VDC source voltage to the appropriate voltage level, LED drivers 1528 coupled to the Trigger Signal Conversion circuit 1526 and step down circuit 1530 and an LED Array 1532 coupled to LED drivers 1528.

In operation, a DC voltage source (2000VDC) 1504 supplies 300VDC to trigger pulse generation circuit 1506. Capacitor (C) 1522 receives a current from source 1502 through resistance (R) 1520 and charges up to 2000 VDC. The voltage from C 1522 is stepped up to approximately 15 kV peak which (for a xenon flash tube) ionizes the xenon gas in the flash tube, causing it to have a low resistance. This discharges C 1522 through the flash tube (for a xenon flash tube, but when using flash head 1502 C is discharged through step down circuit 1530). The value of C 1522 is varied to obtain the desired (low/medium/high) intensity.

However, in accordance with an aspect of the present invention, flash head 1502 is substituted for the xenon flash tube. The trigger pulse from Trigger pulse generator 1506 is coupled via connection 1508 to trigger signal conversion circuit 1526. Step down circuit 1530 receives the anode voltage at connection 1510 and cathode voltage at connection 1514 for the Xenon flash tube. Flash head 1502 comprises an interlock switch 1516, 1518. The voltage from anode 1510 and cathode 1514 can be sensed and used by step down circuit to determine the desired flash intensity (e.g. low/medium/high) and is also converted to the appropriate voltage for the LED array 1532. The output from step down circuit 1530 is provided to LED drivers 1528, which triggers LED array 1532 when a trigger signal is received from trigger signal conversion circuit 1526.

A benefit of the system 1500 is that it enables an LED array to replace a Xenon flash tube. Thus, an existing Xenon flash tube system can be upgraded to an LEE) array system just by changing the flash tube.

Figure 19:
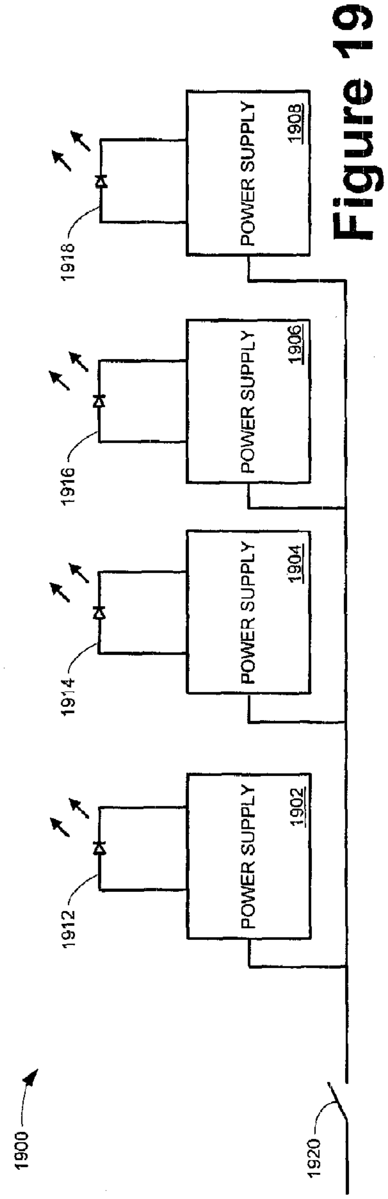
FIG. 19 is a schematic diagram of a circuit for a lighting system employing multiple power supplies.

FIG. 19 is a schematic diagram of a circuit 1900 for a lighting system employing multiple power supplies 1902, 1904, 1906, 1908. Power supply 1902 is coupled to a first string of lights comprising at least one LED 1912. Power supply 1904 is coupled to a second string of lights comprising at least one LED 1914. Power supply 1906 is coupled to a third string of lights comprising at least one LED 1916. Power supply 1908 is coupled to a fourth string of lights comprising at least one LED 1918. Switch 1920 is employed to turn power supplies 1902, 1904, 1906 and 1908 on and off. In operation when switch 1920 is closed, power supply 1902 provides power to LED 1912, power supply 1904 provides power to LED 1914, power supply 1906 provides power to LED 1916 and power supply 1908 provides power to LED 1918. A benefit of using separate power supplies for separate LEDs is that if one or more of power supplies 1902, 1904, 1906 and 1908 or one or more of LEDs 1912, 1914, 1916 and 1918 malfunction, the remaining power supplies will still provide power to the remaining LEDs. For example, if power supply 1902 or LED 1912 malfunctions, light is still provided by system 1900 by LEDs 1914, 1916 and 1918 coupled to power supplies 1904, 1906 and 1908 respectively.

Referring back to FIG. 11 with continued reference to FIG. 19, there is illustrated an embodiment comprising four LED arrays. LEDs 1 belong to a first array, LEDs 2 belong to a second array, LEDs 3 belong to a third array and LEDs 4 belong to a fourth array. Each LED array receives power from its own power supply. Thus, LEDs 1 would receive power from power supply 1902, LEDs 2 would receive power from supply 1904, LEDs 3 would receive power from power supply 1906 and LEDs 4 receives power from power supply 1908.

As can be observed in FIG. 11, the four LED arrays are staggered or interleaved. The arrays are not grouped into a single area, wherein the malfunction of one array would render an entire section of system 1100 dark. Instead, LEDs are interleaved so that a malfunction of one string or power supply would only darken a row or two of each section.

As used in this embodiment, four power supplies 1902, 1904, 1906, 1908 are employed. However, in alternate embodiments any physically realizable number of power supplies can be used. For example, FAA specifications require a light to be taken out of service if more than 20% of the lights are not working. By using five (or more) power supplies (not shown), if one power supply or string ceases to function, only 20% (or less) of the lights are not working, allowing the light to continue functioning until the system can be serviced.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A lighting system, comprising:

a light emitting device;

a driver circuit coupled to the light emitting device operable to operate the light emitting device at a predetermined current to produce a flash at a desired intensity; and a level sensor for determining the desired flash intensity and duration coupled to the driver circuit;

wherein the driver circuit is configured to operate the light emitting device by producing a current pulse for a predetermined amount of time to produce a flash at a lower intensity than the desired flash intensity for a time period that is longer than the duration to produce a flash that emulates the desired flash intensity; and wherein the level sensor is one of group consisting of a current sensor and a voltage sensor.

2. A lighting system according to claim 1, wherein the level sensor is a current sensor, and the driver circuit is responsive to generate a 100 millisecond pulse responsive to the current measuring device detecting a 6.6 amp current, a 30 millisecond pulse responsive to the current measuring device detecting a 5.5 amp current, and a 10 millisecond pulse responsive to the current measuring device detecting a 4.8 amp current.

3. A lighting system according to claim 1, wherein the level sensor is a voltage sensor, and the driver circuit is responsive to generate a 100 millisecond pulse responsive to the voltage measuring device detecting 120 volts, a 30 millisecond pulse responsive to the voltage measuring device detecting 75 volts, and a 10 millisecond pulse responsive to the voltage measuring device detecting 50 volts.

4. A lighting system according to claim 1, wherein the level sensor further comprises a photometric sensor, and the driver circuit is responsive to generate a first flash intensity when the photometric sensor detects light above a predetermined threshold and a second flash intensity when the photometric sensor detects light below the predetermined threshold, wherein the first flash intensity is lower than the second flash intensity.

5. A lighting system according to claim 1, wherein the light emitting device is a Light Emitting Diode array.

6. A lighting system according to claim 1, wherein the predetermined time is determined by a Blondel-Rey equation.

7. A lighting system according to claim 1, further comprising:

a timing circuit coupled to the driver circuit;

a trigger circuit coupled to the driver circuit and to the timing circuit;

wherein the trigger circuit is responsive to receiving an external signal to send a signal to the driver circuit to produce a flash;

wherein the trigger circuit is further responsive to receiving the external signal to reset the timing circuit, otherwise the timing circuit sends a signal to the driver circuit responsive to a predetermined timing interval expiring;

wherein the driver circuit is responsive to the signal from the timing circuit to turn on the light emitting device to produce a flash.

8. A lighting system according to claim 7, wherein the external signal has a pulse width, further comprising the level sensor which is configured to determine the desired flash intensity from the pulse width of the external signal.

9. A lighting system according to claim 1, wherein the driver circuit is responsive to the level sensor to vary the predetermined current and the flash duration based on the desired flash intensity.

10. A lighting system according to claim 1, further comprising:

a voltage to current converting system coupled to the driver circuit for converting a triggering pulse to the driver circuit.

11. A lighting system according to claim 1, further comprising a failure detection circuit that produces one of the group consisting of a failure voltage and a failure current when the failure detection circuit detects a failure of the light emitting device.

12. A lighting system according to claim 1, further comprising:

a housing for enclosing the light emitting device; and an interlock device coupled to the housing and the light emitting device configured to disable the light emitting device when the housing is opened.

13. A lighting system according to claim 1, wherein the light intensity of the light emitting device is characterized by:

$$I_e = \frac{\int_{t1}^{t2} I\,dt}{0.2 + t_2 - t_1}$$

wherein $I_e$ is the Effective Intensity (Candela), I is the Instantaneous intensity (Candela) for a device and $t_1$ is a start time of a flash for the device, $t_2$ is an ending time of the flash for the device;

wherein a difference between $t_1$ and $t_2$ is selected such that $I_e$ is approximately equal to a desired $I_e$ for a flash of light; and wherein a peak value for 1 is less than $I_e$.

14. A lighting system according to claim 1, further comprising:

a zero cross detection circuit coupled to the driver circuit;

wherein the zero cross detection circuit detects zero crossings of an associated alternating current; and wherein the driver circuit is responsive to synchronize a flash from the light emitting device with a zero crossing of the associated alternating current.

* * * * *